March 24, 1931. F. G. ALBORN ET AL 1,797,222
TIRE CARRIER
Filed Nov. 30, 1928 2 Sheets-Sheet 1
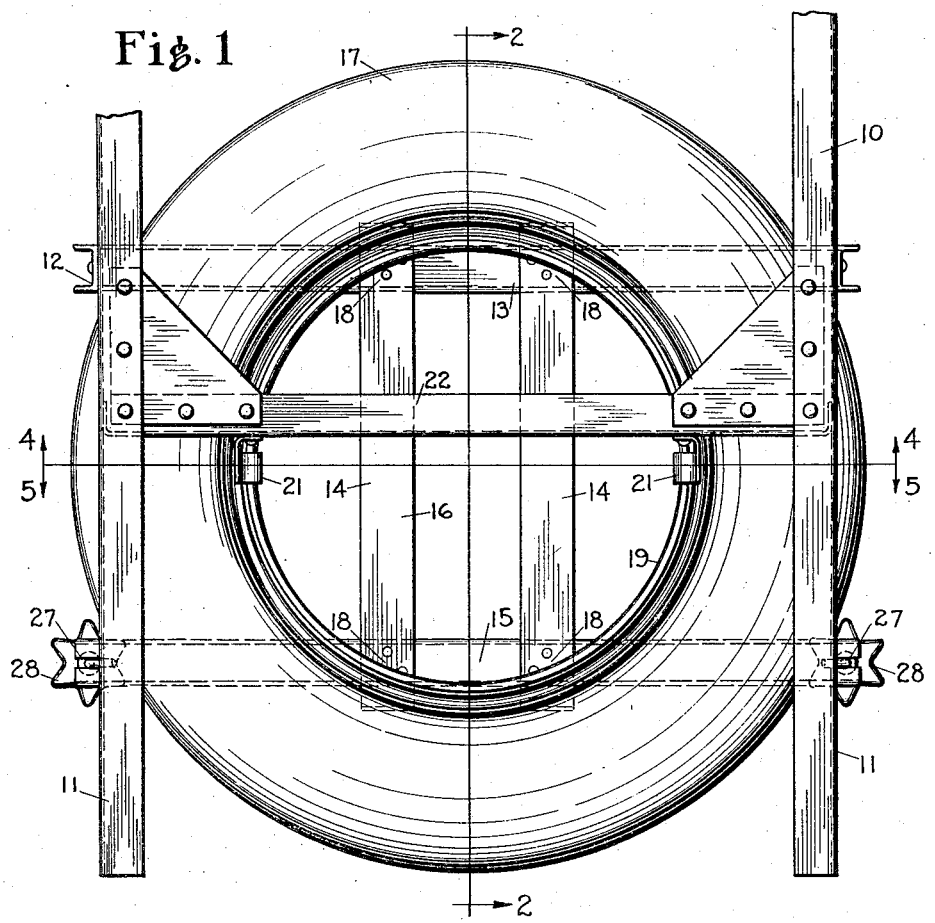
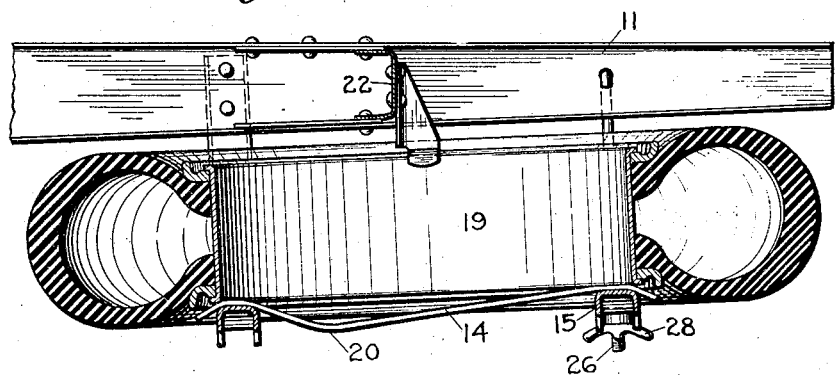
INVENTORS
FRANK G. ALBORN
AND
BY EDWIN H. SAVAGE
RMCooper
ATTORNEY INVENTORS
FRANK G. ALBORN
AND
BY EDWIN H. SAVAGE
RMCooper
ATTORNEY Patented Mar. 24, 1931

1,797,222

UNITED STATES PATENT OFFICE

FRANK G. ALBORN AND EDWIN H. SAVAGE, OF CLEVELAND, OHIO, ASSIGNORS TO THE WHITE MOTOR COMPANY, OF CLEVELAND, OHIO, A CORPORATION OF OHIO

TIRE CARRIER

Application filed November 30, 1928. Serial No. 322,609.

This invention relates to spare tire carriers for motor vehicles.

It is an object of this invention to provide a simple efficient tire carrier of the underslung type which supports the tire in spaced relation to the adjacent parts of the carrier and vehicle.

It is a further object of this invention to provide a tire carrier of the underslung type which permits both a facile placement therein and removal therefrom of heavy tires such as are now in general use on motor trucks.

Other objects will hereinafter appear.

The invention itself will be more readily understood from the description of one practical embodiment thereof, illustrated in the accompanying drawings in which:

Figure 1 is a top plan view of a tire carrier, showing a spare tire mounted therein in carried position.

Figure 2 is a sectional view taken on line 2—2 of Figure 1.

Figure 3:
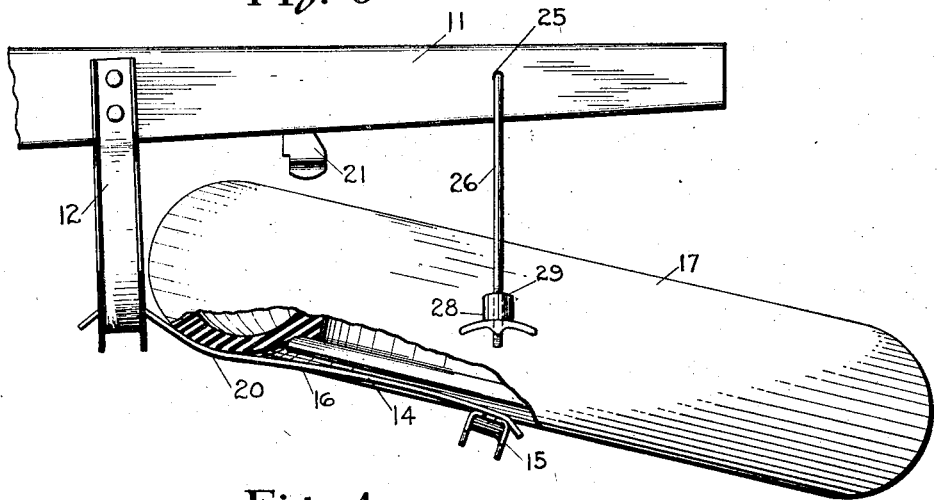
Figure 3 is a side elevation of the carrier, showing the relative positions of the different parts of the carrier, both to themselves and to a spare tire, at an intermediate stage in the placement or removal of the spare tire.
Figure 4:
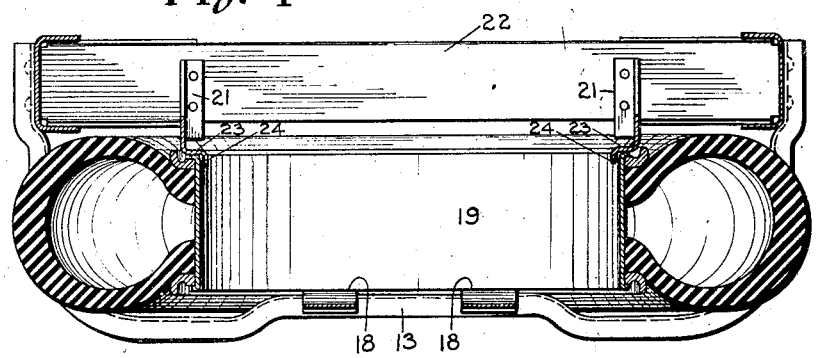
Figure 4 is a sectional view taken on line 4—4 of Figure 1.

Referring to the drawings, the numeral 10 indicates the rear portion of a motor truck frame. Rigidly secured to the frame side rails 11 is a metal stirrup 12 the bottom section 13 of which forms with the members 14 and 15 an underslung platform 16. This platform is designed to support a spare tire 17 and is constructed with raised surfaces 18 which engage the lower surface of the rim 19 to support the tire in spaced relation to the subjacent parts of the platform. It is to be noted that this platform comprises a central unobstructed portion, bounded by and including the members 14, over which a tire may be facilely slid on or off the platform to and from a carried position thereon.

The members 14 of the platform 16 are constructed of resilient material, such as spring steel, and permit the platform to swing downward under the weight of the tire to the position illustrated in Figure 3. In order that the tire 17 may be placed upon and removed from the platform 16 with facility and without subjecting the member 16 to excessive strain by further depression of the rear end of the platform, the members 14 are formed with curvatures 20 which provide a clearance between the platform and pair of overhead tire centering members 21 that exceeds the width of the tire The members 21 are rigidly attached at their upper ends to a frame cross member 22, and are formed with shoulders 23 and flanges 24 designed to engage respectively the upper and inner surfaces of the rim 19. As clearly shown in the drawings, the shoulders 23 are located at such a distance below the frame as to engage the rim 19 to hold the tire 17 in space relation to the frame.

Figure 5:
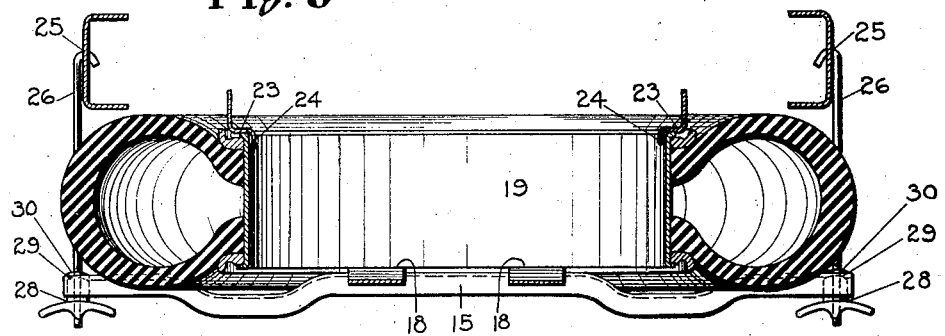
Figure 5 is a sectional view taken on line 5—5 of Figure 1.

Hooked through loosely fitting apertures 25 formed in the side rails 11, there is a pair of depending rods 26. These rods are adapted for insertion within slots 27 formed in the ends of the platform member 15, and carry on their lower threaded ends star-shaped nuts 28 designed for engagement with the lower surface of the member 15. As clearly shown in Figure 5, the nuts 28 are formed with rounded upper ends 29 which fit within complementary recesses 30 formed in the lower surface of the member 15. This interengagement of the nuts 28 with the member 15 is effective in securing the rods 26 within the slots 27.

To assemble a tire within the carrier with the parts occupying the positions illustrated in Figure 3, the tire is placed in centered position upon the platform 16, the rear end of the platform elevated and rods 26 inserted within the slots 27, after which the nuts 28 are turned up to clamp the rim 19 between the platform and the shoulders 23 of the member 21. The removal of the tire is effected by reversing the process just described.

As will readily be apparent the carrier illustrated and described is not restricted in use to tires of the width illustrated, but may be utilized to carry tires of varying smaller widths.

Although the foregoing description is necessarily of a detailed character, in order that the invention may be completely set forth, it is to be understood that specific terminology is not intended to be restrictive or confining, and that various rearrangements of the parts and modifications in structural details may be resorted to without departing from the scope of the invention claimed.

Having described our invention, what we claim as new and desire to secure by Letters Patent is:

1. The combination with a vehicle of a tire carrier suspended therefrom, said carrier comprising a resilient platform adapted to support a spare tire, rigid means rigidly associated with said vehicle and said platform for supporting one end of said platform in spaced relation to said vehicle, means for releasably supporting the opposite end of said platform in certain position with respect to said vehicle, and means for holding a tire upon said platform when said last named end of said platform is supported in the aforesaid position.

2. The combination with a vehicle of a tire carrier suspended therefrom, said carrier comprising a resilient platform adapted to support a spare tire, rigid means rigidly associated with said vehicle and said platform for supporting one end of said platform in spaced relation to said vehicle, means for releasably supporting the opposite end of said platform in certain position with respect to said vehicle, and means depending from said vehicle adapted to hold a tire upon said platform when said last named end of said platform is supported in the aforesaid position, said platform being formed with a depression subjacent said last named means by virtue of which tires of large widths may be facilely placed upon or moved from said platform.

3. The combination with a vehicle of an underslung tire carrier suspended therefrom, said tire carrier comprising a resilient platform adapted to support a spare tire, means rigidly supporting one end of said platform in spaced relation to said vehicle, means pivotally attached to said vehicle adapted to releasably support the opposite end of said platform in a certain position with respect to said vehicle, and means rigidly associated with said vehicle adapted to hold a tire upon said platform when said last named end of said platform is supported in the aforesaid position.

In testimony whereof we hereunto affix our signatures this 28th day of November, 1928.

FRANK G. ALBORN.
EDWIN H. SAVAGE.